United States Patent [19]

Gabriele

[11] Patent Number: 5,529,167
[45] Date of Patent: Jun. 25, 1996

[54] DEVICE FOR CONTINUOUSLY FEEDING ARTICLES FROM A MAIN CONVEYING LINE TO INTERMEDIATE OUTLET WAYS ARRANGED ANGULARLY WITH RESPECT TO THE MAIN LINE

[75] Inventor: Medici Gabriele, Pianoro, Italy

[73] Assignee: PRB Packaging Systems S.r.l., Osteria Grande, Italy

[21] Appl. No.: 359,438

[22] Filed: Dec. 20, 1994

[30] Foreign Application Priority Data

Dec. 23, 1993 [IT] Italy .................................. BO93A0522

[51] Int. Cl.⁶ .................................................. B65G 47/26
[52] U.S. Cl. ........................ 198/457; 198/479.1; 198/456
[58] Field of Search .................................... 198/432, 456, 198/457, 479.1, 717, 728

[56] References Cited

U.S. PATENT DOCUMENTS

| | | | |
|---|---|---|---|
| 4,226,176 | 10/1980 | Macchi | 198/728 X |
| 4,505,373 | 3/1985 | Thomas | 198/432 |
| 4,822,268 | 4/1989 | Bindler et al. | 198/457 X |
| 4,917,229 | 4/1990 | Korkowski | 198/418.4 |
| 4,941,562 | 7/1990 | Proepper et al. | 198/728 X |
| 5,238,100 | 8/1993 | Rose, Jr. et al. | 198/468.6 |
| 5,291,986 | 3/1994 | Wheaton | 198/468.6 |
| 5,409,098 | 4/1995 | Focke et al. | 198/457 X |

FOREIGN PATENT DOCUMENTS

| | | |
|---|---|---|
| 0521428A1 | 3/1993 | European Pat. Off. . |
| 4105273A1 | 8/1991 | German Dem. Rep. ....... B65B 35/50 |
| 1032417 | 6/1966 | United Kingdom ................. 198/728 |

Primary Examiner—James R. Bidwell
Attorney, Agent, or Firm—McAulay Fisher Nissen Goldberg & Kiel

[57] ABSTRACT

The invention is a device which takes over articles from a main conveying line by which a plurality of prongs supported by a rotary drum situated under a slide surface of the main line, upstream of a relative intermediate outlet way, and operated in a phase relation with articles proceeding along the main line, so as to raise the articles from the slide surface, and transfers the raised articles to an intermediate outlet way by pushers movable longitudinally over the main conveying line.

17 Claims, 4 Drawing Sheets

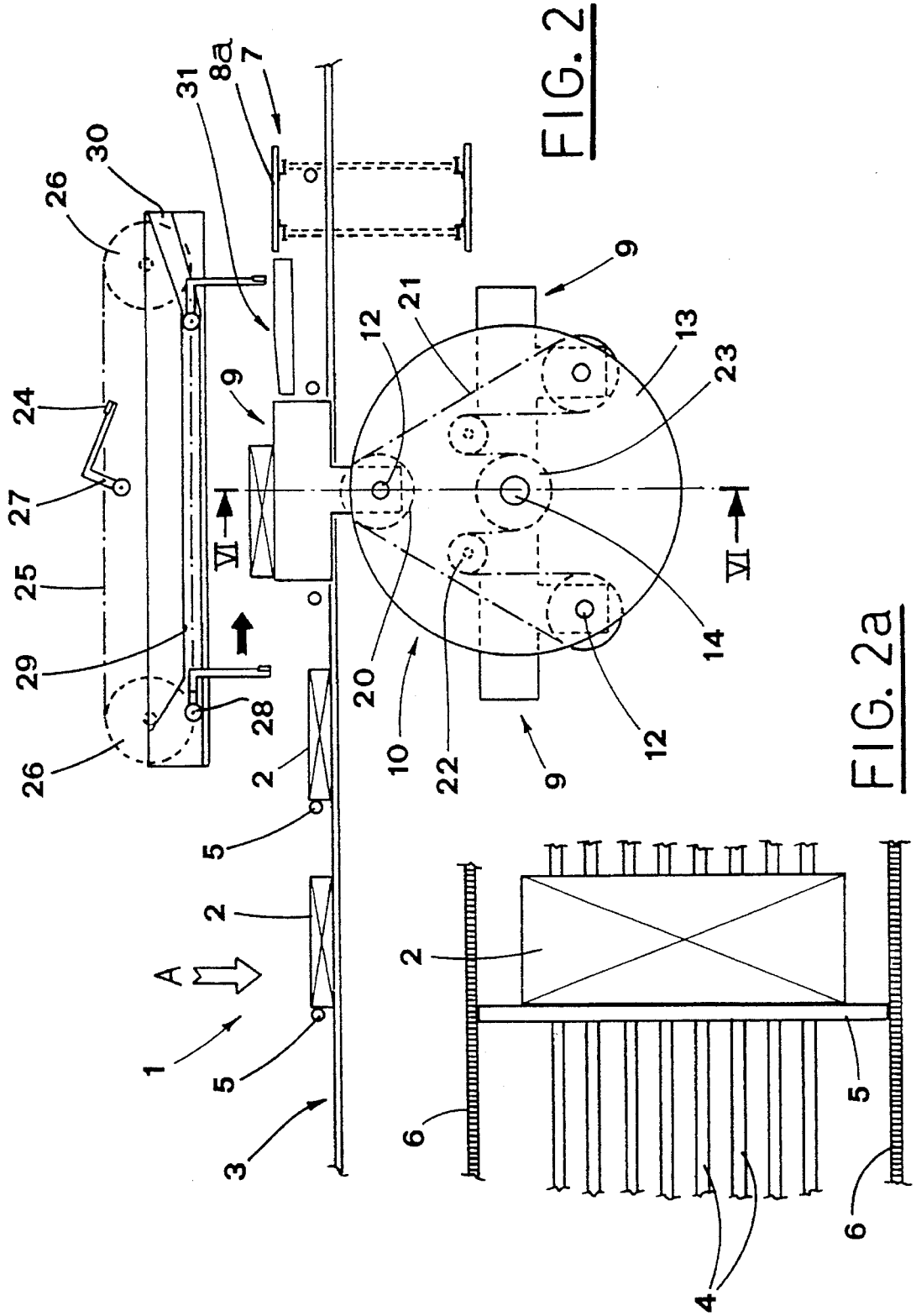

DEVICE FOR CONTINUOUSLY FEEDING ARTICLES FROM A MAIN CONVEYING LINE TO INTERMEDIATE OUTLET WAYS ARRANGED ANGULARLY WITH RESPECT TO THE MAIN LINE

BACKGROUND OF THE INVENTION

The present invention relates to transferring various articles to outlet ways provided along a main conveying line.

DESCRIPTION OF THE PRIOR ART

It is known that in many manufacturing fields the articles, after having undergone other operative phases along the main conveying line, must be transferred to auxiliary conveying lines, in correspondence with intermediate outlets.

Such auxiliary conveying lines are usually arranged at a certain angle with respect to the main line, in particular perpendicular thereto.

Often, a selective transferring to different outlets is required so as to separate different articles coming from the same main line.

This requirement has not been met yet in a simple and efficient way, since the transferring of the articles to different outlets usually necessitates complicated devices, that obviously reduces the productivity.

SUMMARY OF THE INVENTION

The object of the present invention is to propose a device that allows for a continuous selective transferring of articles to one or more intermediate outlets placed along a main conveying line of these articles.

The above mentioned object is achieved by means of a device for continuously feeding articles from a main conveying line to intermediate outlet ways which are arranged angularly with respect to the said main line.

The device includes at least a raising means located beneath the slide surface of the main conveying line, upstream of an intermediate outlet way, this raising means being operated in suitable phase relation with proceeding of articles along said main line, in such a way to take over and raise articles from said slide surface.

The device also includes at least a pushing means movable longitudinally over the said main conveying line, so as to transfer raised articles from said raising means to said intermediate outlet way.

BRIEF DESCRIPTION OF THE DRAWINGS

The characteristic features of the present invention are pointed out in the following, with the particular reference to the enclosed drawings, in which:

FIG. 2 shows the same schematic side view of the device in a different operative step;

FIG. 2a shows a plan view of a part of the main line conveying the articles which advance according to the arrow A of FIG. 2;

DESCRIPTION OF THE PREFERRED EMBODIMENT

Figure 1:
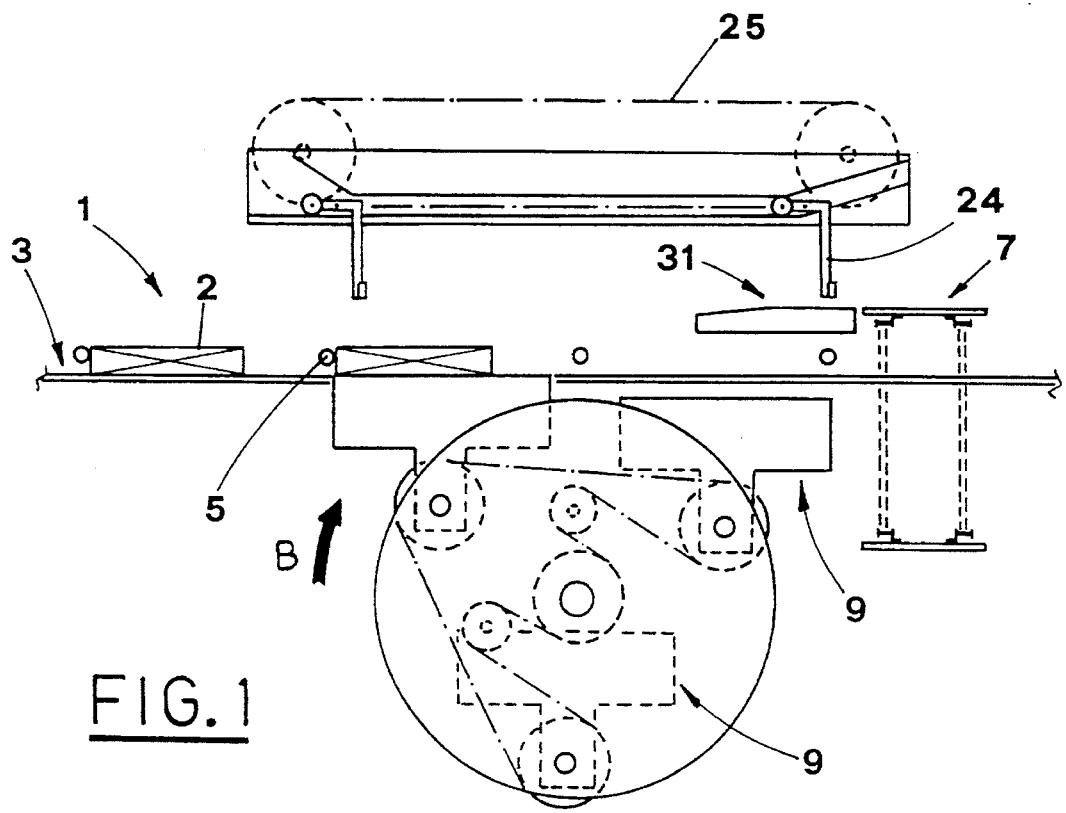
FIG. 1 shows a schematic side view of the device being the subject of the invention.

With reference to the above mentioned figures, the reference numeral 1 indicates the main line conveying the articles 2.

The conveying line 1 includes a slide surface 3 for the articles 2, that is formed, in correspondence with the operative zone of the subject device, by a plurality of longitudinal plates 4 arranged side by side.

Over the slide surface 3 there are a plurality of equispaced movable cross bars 5 that are carried, at their ends, by chain means 6, operated in direction longitudinal to the line 1.

The cross bars 5 are aimed at pushing on the back side of articles 2, or of groups of articles transversely flanked with each other, to be conveyed.

Along the main conveying line, there is located at least one intermediate way 7, to which the articles 2 are discharged, including a relative conveying line 8 perpendicular to the same main line.

Preferably, there are a plurality of intermediate outlet ways, properly spaced apart, for selectively taking over the articles 2 from the main conveying line 1.

It is to be noticed that the upper active run 8a of the conveying line 8 is located over the slide surface 3 of the main line 1, at a suitable distance therefrom, so as to allow the articles conveyed on the line 1 to pass under it.

The device for taking over the articles 2 has, upstream of the outlet way 7, a plurality of raising means 9 moved by a rotary drum means 10.

The drum means 10 is situated under the slide surface 3 of the main conveying line 1 and rotates around a horizontal axis transversal to the line 1.

The raising means 9, e.g. three as in the illustrated case, are arranged regularly along the periphery of the rotary drum 10, and have the form of a comb, constituted by a plurality of prongs 11, carried side by side by a bar 12.

The bar 12 is rotatably mounted between a pair of circular heads 13 of the rotary drum 10.

Figure 6:
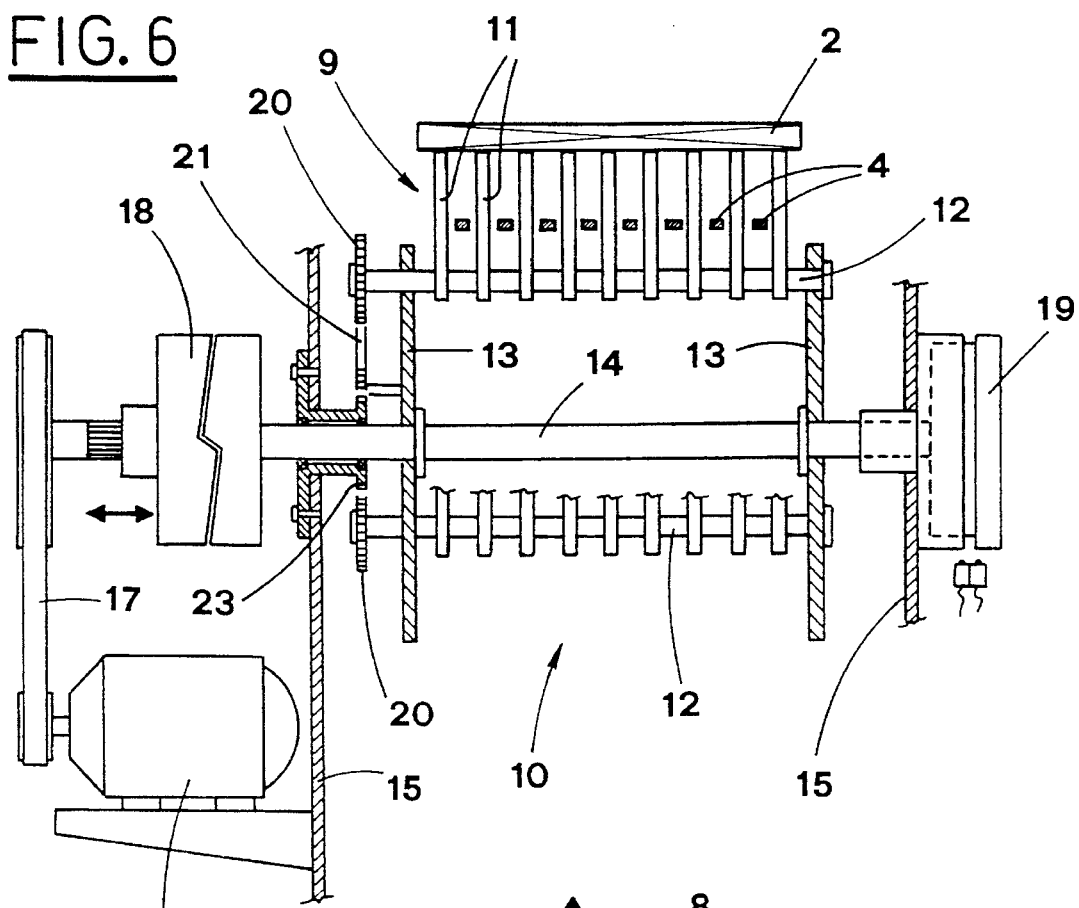
FIG. 6 shows a sectional view taken along the line V—V of FIG. 2.
Figure 7:
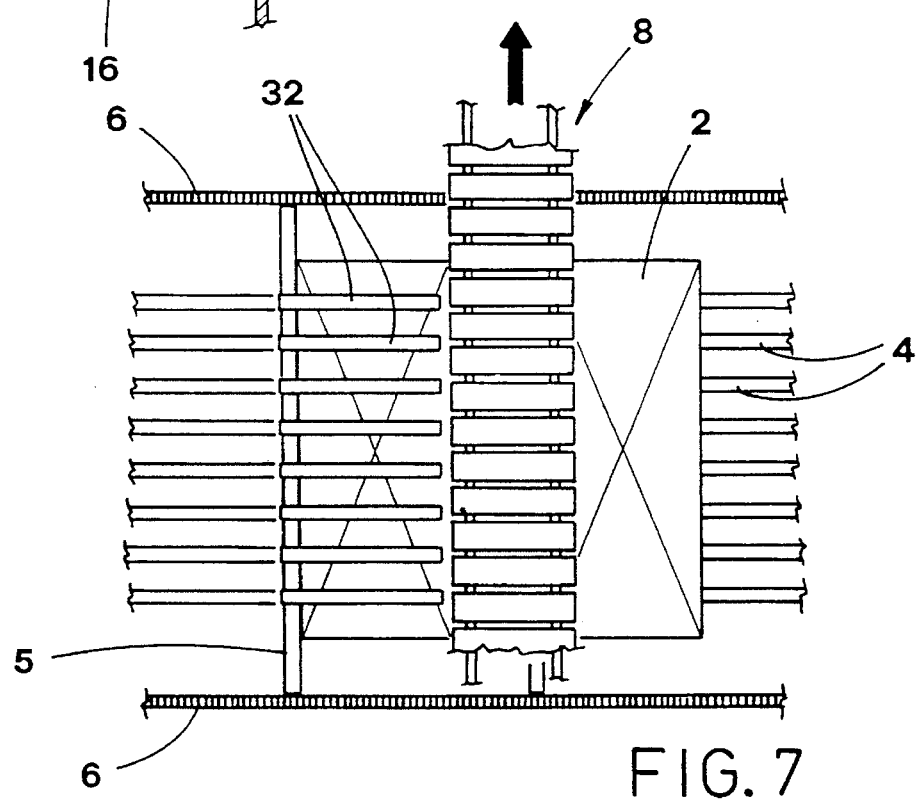
FIG. 7 shows a sectional view taken along the line VII—VII of FIG. 5.

The circular heads 13 are joined to a driving shaft 14 of the rotary drum 10, rotatably supported by a pair of side walls 15 of the device (FIG. 6).

The driving shaft 14 of the rotary drum 10 can be driven to rotate either by driving means 16, through a flexible link 17, or, preferably, by not illustrated means, interlocked with the main driving of the machine in which the present device is inserted.

A front coupling clutch 18 is mounted on the driving shaft 14 to allow deactivation of the taking over device.

The driving shaft 14 is also equipped with braking means 19 for stopping the device.

One end of each bar 12 of the raising means 9, protruding from the circular head 13 of the rotary drum 10, has a toothed wheel 20 fastened thereto.

The toothed wheels 20 are rotated by a toothed belt 21 that are trained around a pair of idler pulleys 22, carried by the said head 13, and a pinion 23, fixed to the adjacent side wall 15. The pinion 23 and the driving shaft 14 are coaxial. The pinion 23 and the toothed wheels 20 are equal in diameter.

The idler pulleys 22 are situated symmetrically at both side of the pinion 23.

It is to be noticed that, during the rotation of the drum 10, a counter-rotation of the bars 12 of the raising means 9 is caused by the gear realised by the toothed wheels 20, 22 and 23 through the belt 21.

In particular, the counter-rotation of the bars 12 is such that the position of raising means 9 is maintained unchanged.

Therefore, the raising means 9, carried by the rotary drum 10, move while keeping the loading surface delimited by the prongs 11 with constant horizontal attitude.

Pushing means 24, made to move by a chain 25 located over the main conveying line 1, are aimed at cooperating with the raising means 9.

The chain 25 is trained around a pair of sprockets 26. The speed with which the said chain 25 is operated is suitably bigger than the advancement speed of the articles 2 along the main line 1.

The pushers 24 are hinged to the chain 25 about respective pivot 27, and bear rollers 28, aimed at running along a longitudinal guide 29 in correspondence with the active run of the same chain 25.

The terminal part 30 of the guide 29 is suitably inclined and makes the pushers 24 to rotate, in a direction contrary to the pusher motion, when the articles 2 are released.

The transferring of the articles 2 on the conveying line 8 of the outlet way 7 is facilitated by an intermediate flat 31, slightly inclined in its initial part, situated at the level of the upper run 8a of this conveying line 8.

The flat 31 is formed by a plurality of longitudinal plates 32, arranged side by side, correspondent to the plates 4 that form the slide surface 3 of the main line 1.

Operation of the present device is described in the following, beginning from the step in which an article 2 is taken over by one of the raising means 9 that is moved, in the direction indicated by the arrow B, by the rotary drum 10 (see FIG. 1).

Each of the comb-shaped raising means 9 is brought in turn, by the rotation of the drum 10, to cross the slide surface 3 of the main line 1 so as to raise a respective article 2 from this surface 3. (FIG. 2)

Figure 5:
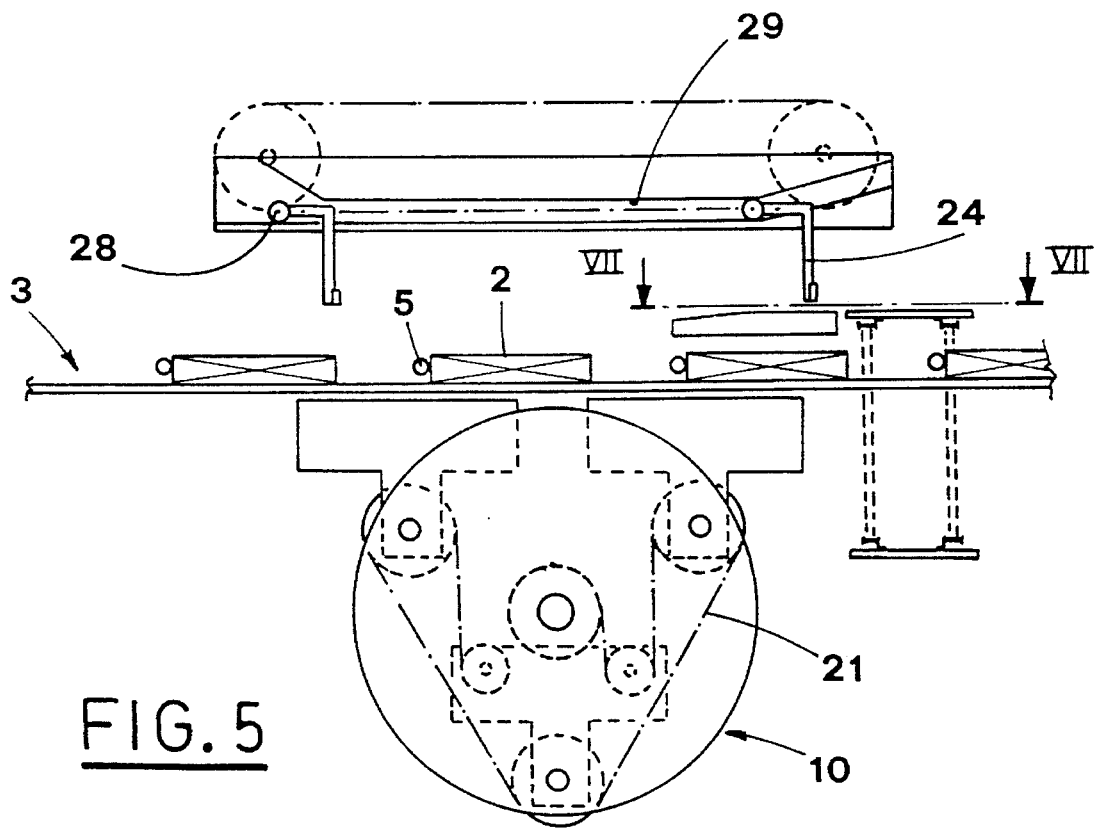
FIG. 5 shows a side view of a further operative step of the device.

It is to be noticed that the prongs 11 of the raising means 9 are staggered with respect to the plates 4 of the slide surface 3, so that, in the raising phase, they insert between these plates 4, as it is seen in FIG. 5.

It is also to be noticed that, at the moment of taking over the article 2 from the main line 1, the speed of the raising means 9 is substantially equal to the advancement speed of the same line 1.

In operation, the raising means goes first up and then down, as a result of the trajectory imposed to the bar 12 by the rotary drum 10.

In the highest position of the raising means 9, its upper surface is substantially lined up with the intermediate flat 31 and with the upper run 8a of the conveying line 8 of the outlet 7.

The article 2, raised by the raising means 9, is pushed by a relative pusher 24, guided along the guide 29 and operated with the speed suitably bigger than the advancement speed of the main line 1.

Figure 3:
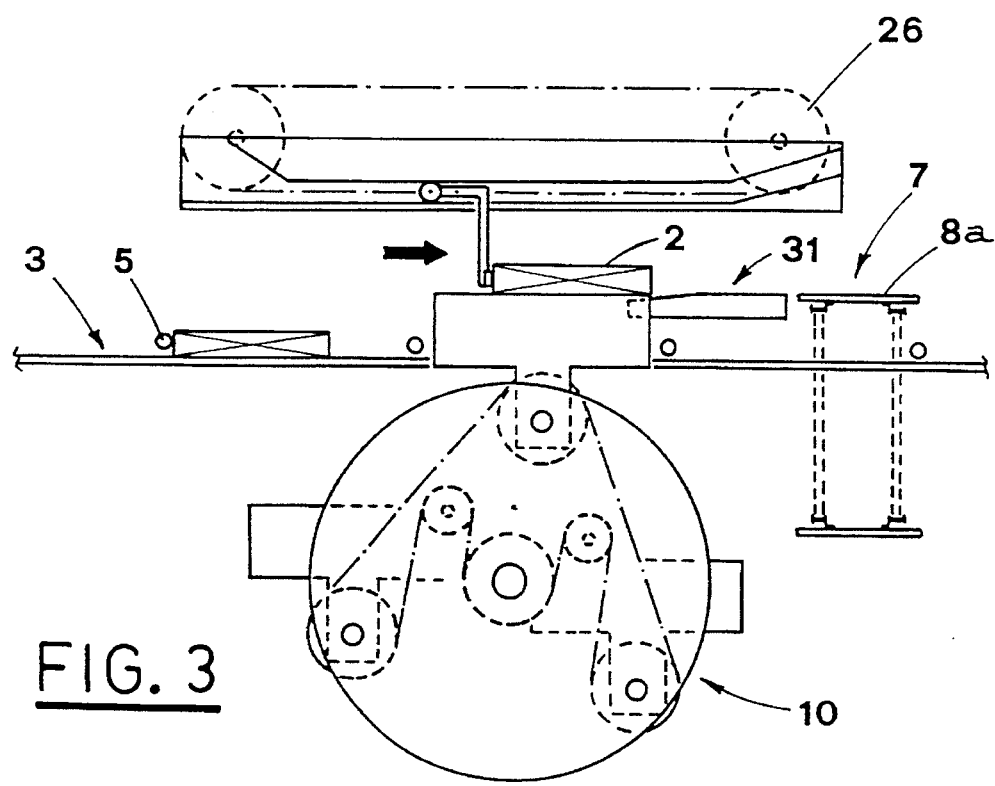
FIGS. 3 and 4 show side views of subsequent operative steps performed by the device.

Consequently, the pusher 24 transfers the above mentioned article 2 from the raising means 9 to the intermediate flat 31 (FIG. 3).

Figure 4:
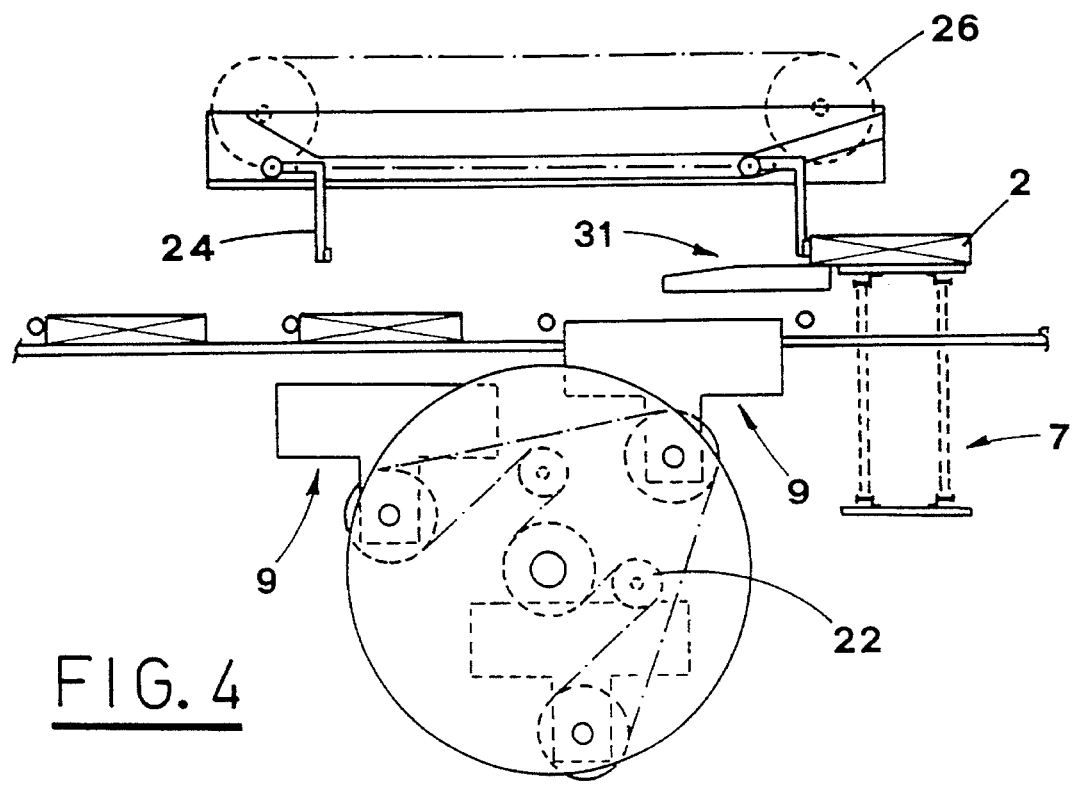

While the raising means 9 goes down, the pusher 24 transfers the article 2 from the intermediate flat 31 to the conveying line 8 of the outlet way 7 (FIG. 4).

When the article 2 has been transferred to the outlet 7, the roller 28 of the pusher 24 enters the inclined terminal part 30 of the guide 29, so that the same pusher 24 is rotated accordingly and subsequently, the transferred article 2 is not more acted on by the same pusher 24.

Thus it is possible to transfer the articles 2 from the main line 1 to the outlet way 7 in a continuous way.

When the article 2, or group of articles, is not to be transferred to the intermediate outlet way, the rotary drum 10 is disconnected and stopped, so as to avoid the raising of the articles 2.

Consequently, the articles proceed along the main line 1 passing under the upper run 8a of the conveying line 8 (FIG. 5).

Suitable sensors define the position in which the rotary drum 10 is stopped so that the raising means 9 do not interfere with the slide surface 3 of the main line 1.

It is to be noticed that, when the articles are to be taken over again, the clutch 18 allows to keep the proper phase relation for rotation of the drum 10, movements of the conveying line 1 and movements of the pushers 24.

The described device for taking over the articles allows for selective taking over thereof from the main line and for transferring them to a suitable outlet way.

Therefore, it is possible to select groups of different articles to be moved to respective outlets in a more suitable way, according to predetermined programs or to different productive requests of the equipment.

As it has already been pointed out, the articles are selectively taken over in a continuous way, without stopping or slowing down or moving the articles away from the conveying path.

This increases the equipment productivity and avoids the risk of wrong functioning or the like.

It is understood that what above has been described as a mere, not limitative example, therefore all possible constructive variants are protected by the present technical solution, as described above and claimed in the following.

What is claimed is:

1. A device for continuously feeding articles from a main conveying line to intermediate outlet ways which are arranged angularly with respect to the main line, the device comprising:

at least one raising means located beneath the slide surface of the main conveying line, upstream of an intermediate outlet way, said raising means being operated in suitable phase relation with articles proceeding along said main line, so as to take and raise articles from said slide surface;

at least one pushing means movable longitudinally over the main conveying line, to transfer raised articles from said raising means to said intermediate outlet way, wherein said pushing means are joined to a chain that is longitudinally arranged above said main conveying line, said chain being driven at a speed higher than the advancement speed of said articles along said main conveying line, said pushing means being jointed to said chain at respective pivots and being equipped with rollers that run along a longitudinal guide adjacent to an active run of said chain, said guide having a terminal part that is inclined so as to rotate said pushing means in a direction contrary to the advancement direction of said articles.

2. A device according to claim 1, wherein a rotary drum means is situated beneath said slide surface and is driven to rotate around a horizontal axis transverse to said main line, this rotary drum means carrying along its periphery a series of said raising means operated in turn to take respective articles and to raise said articles up to an intermediate transferring flat adjacent to the said outlet way, said pushing means being situated close to the same intermediate flat for transferring said articles to said outlet way.

3. A device according to claim 2, wherein each one of said raising means is shaped like a comb and includes a plurality of prongs that insert among corresponding staggered longitudinal plates forming said slide surface, said prongs being supported side by side by a bar rotatably mounted between a pair of circular heads of said rotary drum means, said heads being connected to a driving shaft of said rotary drum means.

4. A device according to claim 2, wherein said intermediate transferring flat is formed by a plurality of longitudinal plates arranged side by side at a level of the upper active run of a conveying line of said outlet way, so that said prongs of said raising means can insert among the said plates.

5. A device according to claim 2, wherein said raising means are driven to rotate in a direction contrary to the rotation direction of said rotary drum means, so that the attitude of the said raising means is maintained unchanged.

6. A device according to claim 5, wherein said raising means are fixed to respective bars rotatably supported by a pair of circular heads of said rotary drum, respective toothed wheels being keyed to the ends of said bars and engaging a toothed belt that is trained around idler pulleys and a pinion fixed to an adjacent side wall, said pinion and said driving shaft of said rotary drum being coaxial.

7. A device according to claim 1, wherein said outlet way includes an outlet conveying line arranged perpendicularly to said main conveying line, an upper active run of said outlet conveying line being located at a level higher than said slide surface of said main conveying line, so that articles being transported along said main conveying line may pass thereunder.

8. A device for continuously feeding articles from the main conveying line to intermediate outlet ways which are arranged angularly with respect to the said main line, a device comprising at least one raising means located beneath the slide surface of the main conveying line, upstream of an intermediate outlet way, the raising means being operated in a suitable phase relation with articles proceeding along said main line, so as to take and raise articles from said slide surface;

at least one pushing means movable longitudinally over the main conveying line, so as to transfer raised articles from the raising means to the intermediate outlet way;

a horizontal rotary drum means situated beneath said slide surface and driven to rotate along the horizontal axes transverse to the main line, the rotary drum means carrying along its periphery a series of the raising means operated in turn to take respective articles and to raise said articles up to an intermediate transferring flat adjacent to the outlet way, said pushing means being situated close to the same intermediate flat for transferring said articles to said outlet way, said raising means being driven to rotate in a direction contrary to the rotation direction of said rotary drum means so that attitude of the raising means remains unchanged.

9. A device according to claim 8, wherein a plurality of said pushing means are jointed to a chain that is longitudinally arranged above said main conveying line and that is driven with a speed higher than the advancement speed of said articles along said main conveying line.

10. A device according to claim 9, wherein said pushing means are jointed to said chain at respective pivots and are equipped with a rollers that are made to run along a longitudinal guide adjacent to the active run of said chain, said guide having a terminal part that is inclined so as to make said pushing means to rotate in a direction contrary to the advancement direction of said articles, when said articles are released.

11. A device for continuously feeding articles from a main conveying line to intermediate outlet ways which are arranged angularly in respect to the main line, the device comprising:

at least one raising means located beneath a slide surface of the main conveying line, upstream of an intermediate outline way;

a horizontal rotary drum means, situated beneath said slide surface, for carrying along its periphery said raising means;

at least one pushing means movable longitudinally over the main conveying line and along an intermediate transferring flat, so as to transfer raised articles from said raising means to said intermediate outlet way;

said slide surface being formed by parallel spaced apart longitudinal plates, each of said raising means having a plurality of prongs that insert among said longitudinal plates of said slide surface; and, said raising means being operated selectively in suitable phase relation with articles proceeding along said main line, so as to take and raise selective articles from said slide surface.

12. A device according to claim 11, wherein said prongs of each raising means are supported side by side by a bar rotatably mounted between a pair of circular heads of said rotary drum means, said heads being connected to a driving shaft of said rotary drum means.

13. A device according to claim 11, wherein said intermediate transferring flat is formed by a plurality of longitudinal plates arranged side by side at a level of an upper run of a conveying line of said intermediate outlet way, so that said prongs of said raising means can insert among the said longitudinal plates.

14. A device according to claim 11, wherein said raising means are driven to rotate in a direction contrary to the rotation direction of said rotary drum means, so that the attitude of the raising means remains unchanged.

15. A device according to claim 14, wherein said raising means are fixed to respective bars rotatably supported by a pair of circular heads of said rotary drum, respective toothed wheels being keyed to the ends of said bars and engaged to a toothed belt located around idler pulleys and a pinion fixed to an adjacent side wall, said pinion and a driving shaft of said rotary drum being coaxial.

16. A device according to claim 11, wherein said pushing means are jointed to respective pivots of an endless moving chain that is longitudinally arranged above said mean conveying line, each of said pushing means being equipped with a roller that is made to run along a longitudinal guide adjacent to an active run of said chain, said guide having a terminal part that is inclined so as to make said pushing means rotate in a direction contrary to the advancement direction of said articles.

17. A device for continuously feeding articles from the main conveying line to intermediate outlet ways which are arranged angularly with respect to the said main line, a device comprising at least one raising means located beneath the slide surface of the main conveying line, upstream of an intermediate outlet way, the raising means being operated in a suitable phase relation with articles proceeding along said main line, so as to take and raise articles from said slide surface;

at least one pushing means movable longitudinally over the main conveying line, so as to transfer raised articles from the raising means to the intermediate outlet way;

a horizontal rotary drum means situated beneath said slide surface and driven to rotate along the horizontal axes transverse to the main line, the rotary drum means carrying along its periphery a series of the raising means operated in turn to take respective articles and to raise said articles up to an intermediate transferring flat adjacent to the outlet way, said pushing means being situated close to the same intermediate flat for transferring said articles to said outlet way, said intermediate transferring flat being formed by a plurality of longitudinal plates arranged side by side at a level of an upper active run of a conveying line of said outlet way, so that said prongs of said raising means can insert among the said plates.

* * * * *